Nov. 4, 1924.

F. H. VAN HOUTEN

FLOUR DUSTER

Filed Aug. 18, 1923

Inventor
F. H. Van Houten
By Church & Church
His Attorneys

Nov. 4, 1924.
F. H. VAN HOUTEN
1,514,186
FLOUR DUSTER
Filed Aug. 18, 1923   2 Sheets-Sheet 2
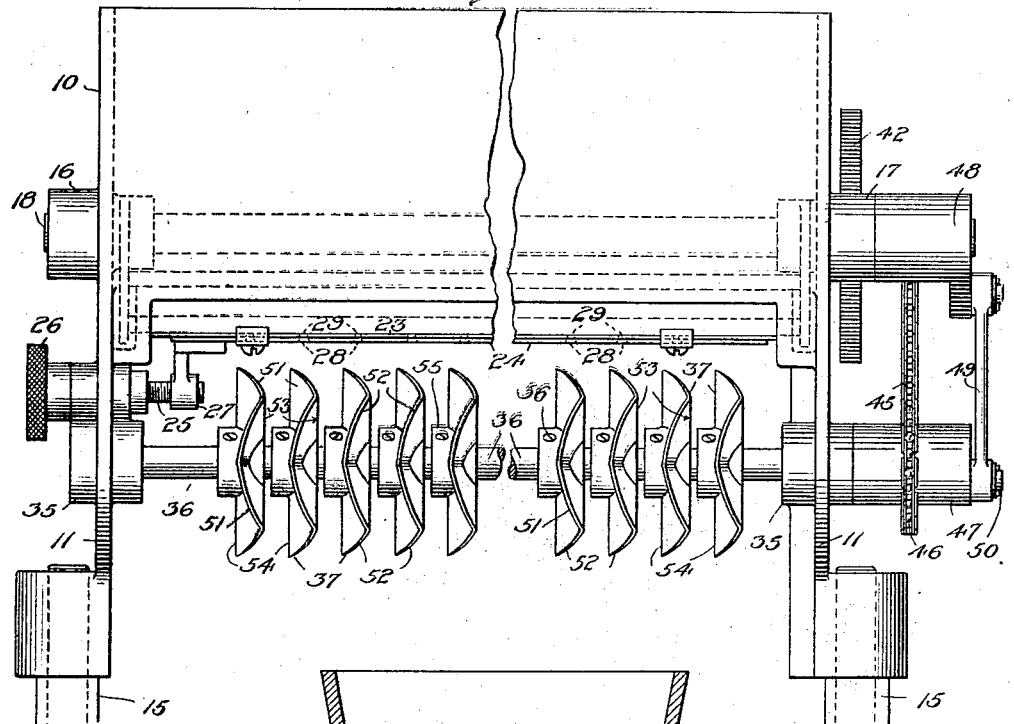
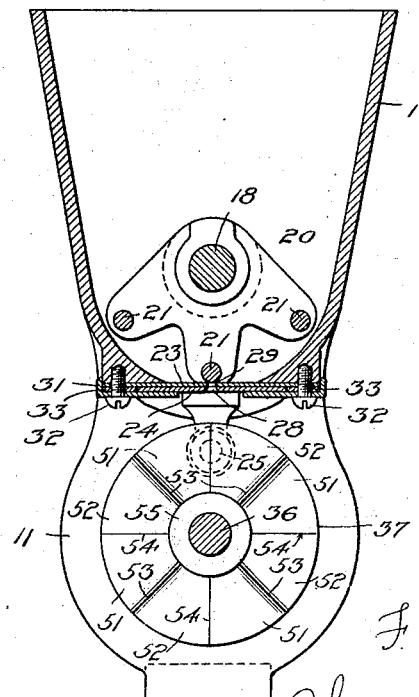
Inventor
F. H. Van Houten
By Church & Church
His Attorneys Patented Nov. 4, 1924.

1,514,186

UNITED STATES PATENT OFFICE.

FRANK H. VAN HOUTEN, OF BEACON, NEW YORK, ASSIGNOR TO DUTCHESS TOOL COMPANY, OF BEACON, NEW YORK, A CORPORATION OF NEW YORK.

FLOUR DUSTER.

Application filed August 18, 1923. Serial No. 658,143.

*To whom it may concern:*

Be it known that I, FRANK H. VAN HOUTEN, a citizen of the United States, residing at Beacon, in the county of Dutchess and State of New York, have invented certain new and useful Improvements in Flour Dusters; and I do hereby declare the following to be a full, clear, and exact description of the same, reference being had to the accompanying drawings, forming part of this specification.

This invention relates to devices for dusting flour and has for its object the provision of means for thoroughly and economically sprinkling flour on dough being handled preparatory to making bread therefrom.

A further object of the present invention relates to the provision of a machine for delivering a desired quantity of flour in a stream and in breaking up the stream of flour to spread it completely over pieces of dough in scaling, rounding, proofing, or molding.

In order that dough may not stick it is necessary to dust the pieces of dough and it is highly desirable that the flour be dusted evenly over the entire surface of the dough. Where the flour is merely sifted on the dough it has been found that it is quite difficult to insure that the entire surface of the pieces of dough be covered. By sifting the flour through an adjusted opening and then breaking the stream of flour into a spray or cloud a less quantity of flour is necessary and a much more even coating is secured.

In the drawings,—

Fig. 3 is a side elevation.

Fig. 4 is a vertical transverse section.

Figure 1:
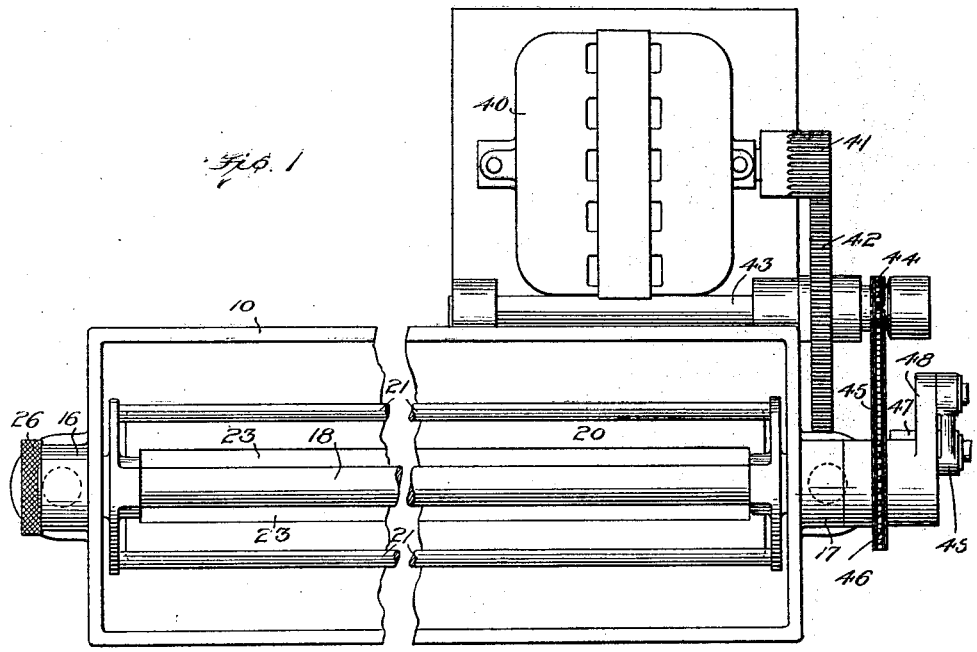
Figure 1 is a plan view of a machine embodying the present invention.
Figure 2:
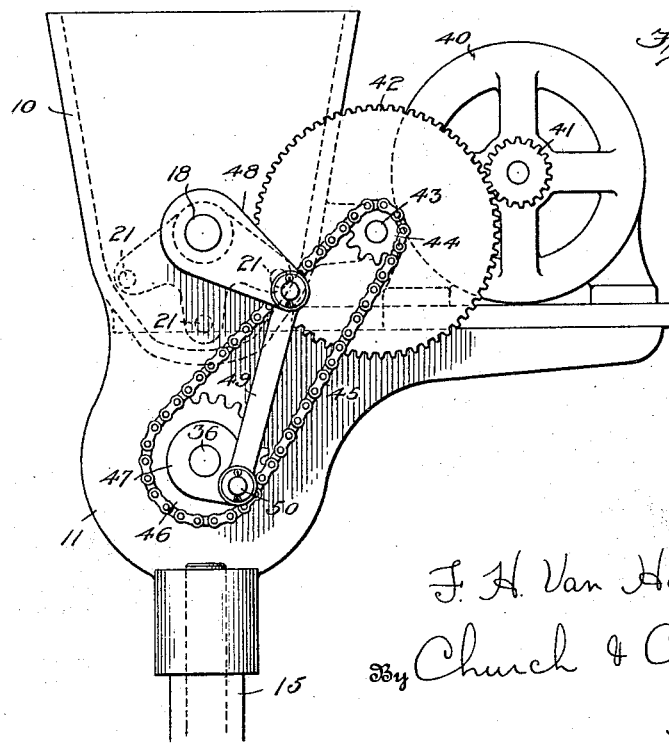
Fig. 2 is an end view.

The flour trough 10 is preferably integral with the side pieces 11 which end in sections 12 for convenient attachment to a scaling machine, a rounding-up machine, a proofer, a molder or an automatic dough divider as indicated diagrammatically at 15. The trough has a rounded bottom and outwardly sloping sides as is customary and is provided with bearings 16 and 17 for the central shaft 18 supporting at either end a spider 20 in which spiders are mounted a plurality, preferably three, of rods 21 concentrically spaced with respect to the shaft 18 and at such distance therefrom as to just touch the stationary plate 23 which closes the slotted bottom of the trough.

A second and movable plate 24 is adjustable lengthwise of the trough being controlled by a screw 25 having a knurled head 26 and engaging a boss 27 carried by the movable plate 24 so as to bring the holes 28 of the movable plate 24 into registry with the similar holes 29 in the stationary plate 23 and at the other end of its travel to entirely close the holes 29. By this simple means the amount of flour passing through the cooperating openings 28 and 29 may be regulated with a great degree of nicety. The sliding plate 24 is guided by the two strips 31 secured to the bowl of the trough in any desired manner as for example by the screws 32 which also lock the stationary plate 23 in place there being washers such as 33 to provide for the proper amount of play between the strips 33 and the stationary plate 23.

In the bearings 35 in the end pieces 11 is mounted a spreader shaft 36 on which are secured a plurality of spreader wheels 37, the shaft 36 being driven from a suitably mounted motor such as 40 by a train of mechanism such as the pinion 41 on the armature shaft, the large gear 42 on countershaft 43, the sprocket wheel 44 on the same shaft, the chain 45 and the sprocket wheel 46 mounted on a crank hub 47 keyed to the shaft 36.

Oscillating movement of the shaft 18 is preferably arranged by mounting a crank 48 on the shaft 18 and connecting this crank by means of a link 49 to the crank pin 50 on the crank hub 47 whereby the movements of the agitator rods 21 and the spreader wheels 37 are secured in timed relation.

The flour duster described is placed over one of the ordinary type Beacon automatic dough dividers for example and the trough is filled with flour. The oscillation of the shaft 18 causes the three agitator rods 21 to pass successively across the alined openings 28 and 29 discharging an intermittent but practically constant stream of flour in the direction of the axis of the shaft 36. It will be understood from the foregoing description that by moving the plate 24 slightly to one side the holes which are cylindrical when 28 and 29 are in perfect registry will be made double convex in shape and therefore smaller and in such way that exact quantity of flour to be delivered may be controlled. The flour in such streams is discharged to the spreader wheels which are preferably of the particular configuration shown consisting in a number of blades 46, 47, etc., arranged at an angle of about 120° to each other, these blades preferably, although not necessarily, being integral with one another and being so related that the streams of flour are delivered first to the right and then to the left of a given spreader wheel, the holes in the trough being midway between the vertices 50 and 51 at the junction of the different fan blades.

Each of the spreader wheels has an enlarged hub portion 52 having a bore therein such as 53 to receive a set screw by means of which the spreader wheel may be secured in proper position on the shaft. These spreader wheels are the same in number as the alined holes 28 and 29 and as stated are directly beneath them so that the rotation of the spreader shaft 36 transforms the several streams of flour into one continuous spray or cloud since the spreader wheels throw the flour alternately in opposite directions thus insuring a very even and complete layer of flour over the pieces of dough.

What I claim is:

1. In a flour duster, a trough having a plurality of holes in the bottom thereof, an agitator within the trough, a rotating shaft beneath the holes in the trough, and a plurality of spreaders on said shaft each of said spreaders having a plurality of angularly disposed fan blades acting to divert the streams of flour from the trough first in one direction and then in opposite direction.

2. In a flour duster, a trough having a plurality of alined holes in the bottom thereof, a sliding plate having a plurality of holes therein adapted to register with the holes in the bottom of the trough, means for moving said plate with respect to the trough, a spreader shaft arranged with its axis in the same plane as said alined openings and a plurality of angularly disposed blades on said spreader shaft adapted to transform the streams of flour discharged from the trough into a spray.

3. In a flour duster, a trough having a plurality of alined holes therein a spreader shaft beneath said alined holes, a plurality of blades or vanes angularly disposed with respect to each other on said spreader shaft, an agitator within said trough, means for varying the size of the openings in the bottom of the trough and a single means for simultaneously driving the agitator and the spreader shaft.

4. In a flour duster, a trough having a hole in the bottom thereof discharging flour by gravity, a spreader wheel beneath said hole, a plurality of angularly disposed blades on said spreader wheel, and means for securing said spreader wheel on said shaft so that the stream of flour from said hole will be diverted by said spreader first in one direction and then in the opposite direction to form a spray or cloud.

FRANK H. VAN HOUTEN.